Figure 1:
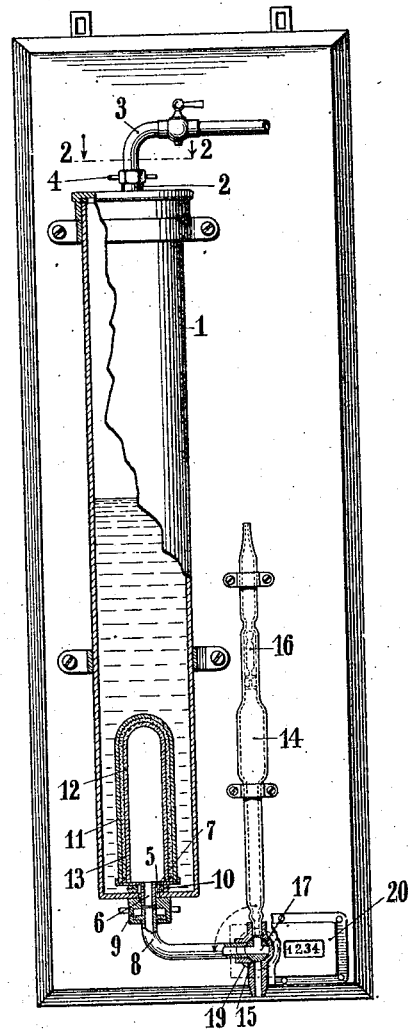

S. LOEWENTHAL & K. LÜER.
RADIO-ACTIVE MASS.
APPLICATION FILED JAN. 29, 1908.

907,066.

Patented Dec. 15, 1908.

2—2.

Witnesses
Inventors
Siegfried Loewenthal
Kurt Lüer
by
Dickerson, Brown + Raegener Attys

UNITED STATES PATENT OFFICE.

SIEGFRIED LOEWENTHAL, OF BRAUNSCHWEIG, AND KURT LÜER, OF CHARLOTTENBURG GERMANY, ASSIGNORS TO THE FIRM OF RADIOGEN GESELLSCHAFT MIT BESCHRANKTER HAFTUNG, OF CHARLOTTENBURG, GERMANY.

RADIO-ACTIVE MASS.

No. 907,066.  Specification of Letters Patent.  Patented Dec. 15, 1908.

Application filed January 29, 1908. Serial No. 413,174.

*To all whom it may concern:*

Be it known that we, SIEGFRIED LOEWENTHAL, citizen of the German Empire, and resident of Braunschweig, Germany, physician, and KURT LÜER, citizen of the German Empire, and resident of Charlottenburg, near Berlin, Germany, apothecary, have invented certain new and useful Improvements in Radio-Active Masses, of which the following is a specification.

According to this invention, radio-active substances are used in the form of masses in solid aggregate state and consisting of neutral material permeable to emanations, with radio-active substance incorporated into and distributed through the same.

For the neutral solid bodies containing radio-active substances porous substances permeable to emanations are chiefly used, such as for instance kieselguhr or fossil meal, in the shape of pieces, or in a state of more or less fine division, while the radio-active substance incorporated into the said solid bodies, can consist both of insoluble and soluble salts of radium, such as for instance radium barium carbonate, or radium chlorid or radium bromid or even radium ores. The manufacture of such radio-active masses of high activity, is preferably effected in such manner that the radio-active substances available (ores, insoluble or soluble salts of radium) are finely ground, and mixed with the neutral substances, preferably fossil meal, permeable to the emanations. In this way the radio-active raw materials are opened up or separated, which results in a considerable increase of the radio-activity, radio-activity being proportional to the surface of such material. After the radio-active substances have been finely ground in mixture with neutral substances, the pulverulent mass can be compressed into any desired shape.

Owing to the incorporation of the radio-active substances into neutral material permeable to emanations by grinding, the solid bodies to be produced from the said mass are of comparatively small mechanical strength, as the well-known ways of strengthening or solidifying by the addition of binding means or by sintering together cannot be used, since, by such treatment the radio-activity of the material would be reduced. In order to compensate for this lack of strength, it is advisable to inclose the mass obtained by the grinding of radio-active substances and neutral material, in reservoirs of porous material permeable to emanations, for instance kieselguhr. In that way, without considerably reducing the radio-active power, loss of radio-active mass is prevented in an efficacious manner. The so-called Berkefeld filter candles or tubular filters, have proved specially suitable for being used as kieselguhr-reservoirs.

The radio-active solid bodies according to this invention, whether inclosed in a casing of porous material (kieselguhr) permeable to emanations or not, are preferably stored inside a casing comparatively impermeable to emanations, for instance of celluloid, vulcanized rubber, or even metal, and for the purpose of expelling the emanations in a space which is to be enriched therewith, are exposed to a heating or to a moist atmosphere, or if desired to a combination of both. The storing or keeping of radio-active substances in a casing impermeable to emanations has for its object to prevent the emanations from being lost without any use being made of them, in case the radio-active substances are accidentally exposed to the action of moist air or heat. By radio-active substance, is understood throughout the specification and claims, generally every substance containing one of the radio-elements for instance radium, thorium or actinium or a compound of such substances.

The formation of shaped masses by the incorporation of radio-active substance into a neutral material which, however, is permeable to emanations, facilitates the use of radium preparation in as far as the mass can be detachably introduced into a casing impermeable to emanations without it being necessary to use large quantities of radio-active substance, and it can be removed from the said impermeable casing as required.

Radio-active preparations according to this invention are more particularly suitable for enriching liquids with emanations such liquids being preferably used for medical purposes. To that end, the radio-active mass is inclosed in a body permeable to emanations, preferably kieselguhr, and the latter is arranged in front of the outlet of a vessel in such manner that liquid introduced into the vessel, when being taken out, must pass through the porous body inclosing the radio-active substance.

A construction of a device according to this invention is illustrated in the accompanying drawing, in which—

Figure 3:
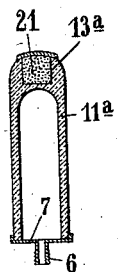
Figure 2:
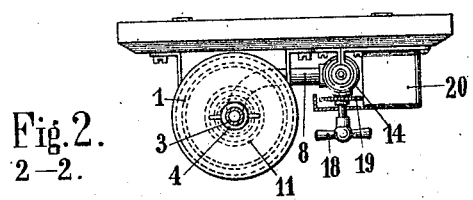

Figure 1 is a front elevation, partly in section, it being assumed that the radio-active substance is arranged between two bell-shaped elements made of kieselguhr. Fig. 2 is a section on the line 2—2 of Fig. 1. Fig. 3 shows a modified construction of a detail in which a cartridge of a radio-active substance is arranged in a recess in a kieselguhr bell.

The reservoir intended to receive the liquid to be enriched with radium emanations is marked 1. It is provided at the top with an inlet branch 2 to which is screwed a supply pipe 3 by means of a nut or union 4. At its lower end, the reservoir 1 is provided with an opening 5 through which projects a pipe 6 secured to a tray or plate 7 in the interior of the reservoir 1, and connected to an outlet pipe 8 by means of a union 9. A packing ring 10 is arranged round the pipe 6 and pressed against the tray 7 so that the liquid cannot pass from the interior of the reservoir 1, to the opening 5. Two kieselguhr bells 11 and 12, one within the other, are cemented to the tray 7 and leave between them a narrow intermediate space 13 which is filled with radio-active substance. 14 is a pipette cemented to a cock casing 15 which at the same time is connected to the outlet pipe 8 of the reservoir 1. A float 16 is arranged above the measuring space of the pipette 14. A three-way cock 17 arranged in the cock casing 15 is provided with a handle 18. On the cock spindle is mounted a toothed wheel 19 projecting into the casing 20 of a counting mechanism and operating the same.

The use and the working of the apparatus described are as follows: The kieselguhr bells 11, 12 with the intermediate layer of radio-active substance are introduced into the reservoir 1, after the removal of the upper cover of the same, so that the pipe branch 6 of the supporting plate or tray 7 projects through the bottom opening 5 of the reservoir. The outlet pipe 8 is then connected by means of the nut 9 to the pipe branch 6, and the cover of the reservoir 1 is replaced so that the parts are in the position shown in Figs. 1 and 2. Liquid, preferably water, is then admitted into the reservoir 1 through the inlet pipe 3, and the said liquid exposed for a given time to the action of the radio-active substances. As soon as it has been enriched to a desired extent with radium emanations, the liquid is discharged through the bell shaped elements by turning the cock 17 in such manner that the pipette 14 is discharged through the outlet branch of the cock casing. The float 16 sinks from its closing position, so that air can enter the pipette from the top, and the pipette is completely emptied. The cock is thereupon turned back into the position shown in the drawing, in which the tank 1 is in communication, with the pipette 14 which is then filled with a given quantity of liquid, as the supply of liquid from the reservoir 1 to the pipette is closed by the float 16 as soon as the float has been raised into its closing position by the liquid rising in the pipette. The liquid is thereupon discharged in the same way as before. If it is desired to obtain a certain average time of action of the radio-active substance, on the liquid, a given number of pipette contents can be discharged every day, this number being indicated by counting mechanism, and the liquid discharged from the reservoir 1 replaced by admitting fresh liquid through the inlet pipe 3. When then next day the same amount is discharged, there will be a guarantee that the liquid discharged is charged in the same way with emanations of radium, as a reduction of the radio-active action of the radio-active substance inclosed between the kieselguhr bells 11 and 12 takes place only in the course of long periods of time. The whole liquid discharged from the tanks must pass through the kieselguhr bells 11 and 12 and therefore at the same time through the layer of radio-active mass before it reaches the outlet.

The modification of the device shown in Fig. 3 consists chiefly in the fact that instead of two kieselguhr bells 11 and 12 there is provided only one bell 11ª containing in its recess 13ª a cartridge or charge 21 of radio-active substance.

We claim:

1. A radio-active substance consisting substantially of kieselguhr containing incorporated radio-active substances.

2. A radio-active mass having the form of an arbitrarily shaped, solid block consisting substantially of kieselguhr containing incorporated radio-active substances.

3. A radio-active mass having the form of an arbitrarily shaped, solid block consisting of kieselguhr containing incorporated radio-active substances, said solid block being inclosed by a solid porous cover consisting substantially of kieselguhr.

4. A radio-active mass having the form of an arbitrarily shaped solid, porous block consisting of neutral material containing incorporated radio-active substances; said solid, porous block being arranged in a reservoir having an outlet-opening in such a manner that the block bars the outlet-opening so as to force any fluid drawn off from the reservoir through said outlet-opening to penetrate through the porous radio-active block.

5. A radio-active mass having the form of an arbitrarily shaped solid block consisting substantially of kieselguhr containing incorporated radio-active substances and being arranged in a reservoir having an outlet-opening in such a manner that the block bars the outlet-opening so as to force any fluid drawn off from the reservoir through said outlet-opening to penetrate through the porous radio-active block.

6. A radio-active mass in the form of a porous bell-shaped body containing radio-active material and consisting substantially of kieselguhr; said bell-shaped radio-active body being arranged in a reservoir having an outlet in such a manner that the outlet is covered by said bell.

7. A radio-active mass having the form of an arbitrarily shaped, solid block consisting substantially of kieselguhr containing incorporated radio-active substances, said mass being inclosed by and removably connected with a casing comparatively impermeable to emanations.

In testimony whereof we have signed this specification in the presence of two subscribing witnesses.

SIEGFRIED LOEWENTHAL.
KURT LÜER.

Witnesses:
HENRY HASPER,
WOLDEMAR HAUPT.